US010135045B2

(12) United States Patent
Wang

(10) Patent No.: US 10,135,045 B2
(45) Date of Patent: Nov. 20, 2018

(54) BATTERY PACK WITH LIGHT SOURCE

(71) Applicant: AMPRO NORTH AMERICA CORP., Chino Hills, CA (US)

(72) Inventor: Scott Chien-Kuo Wang, Irvine, CA (US)

(73) Assignee: Ampro North America Corp., Chino Hills, CA (US)

( * ) Notice: Subject to any disclaimer, the term of this patent is extended or adjusted under 35 U.S.C. 154(b) by 297 days.

(21) Appl. No.: 15/001,063

(22) Filed: Jan. 19, 2016

(65) Prior Publication Data

US 2017/0207429 A1 Jul. 20, 2017

(51) Int. Cl.
H01M 2/10 (2006.01)
F21L 4/08 (2006.01)
F21L 4/02 (2006.01)
F21V 23/04 (2006.01)
F21V 21/096 (2006.01)
H01M 10/48 (2006.01)
H01M 6/50 (2006.01)
H01M 2/30 (2006.01)

(52) U.S. Cl.
CPC .............. *H01M 2/105* (2013.01); *F21L 4/02* (2013.01); *F21L 4/08* (2013.01); *F21V 21/0965* (2013.01); *F21V 23/0414* (2013.01); *H01M 2/30* (2013.01); *H01M 6/505* (2013.01); *H01M 10/488* (2013.01); *H01M 2220/30* (2013.01)

(58) Field of Classification Search
CPC ...... H01M 6/505; H01M 10/488; H01M 2/02; H01M 2/105; F21L 4/02; F21L 4/08; F21V 21/0965

USPC .................................................. 362/183, 194
See application file for complete search history.

(56) References Cited

U.S. PATENT DOCUMENTS

| 5,626,979 | A | * | 5/1997 | Mitsui | .................... | H01M 2/105 |
| | | | | | | 362/9 |
| 7,850,332 | B2 | * | 12/2010 | Opolka | ............... | H01M 2/1044 |
| | | | | | | 362/202 |
| 8,197,084 | B2 | * | 6/2012 | Dubois | .................... | F21L 4/027 |
| | | | | | | 362/120 |
| 2002/0043959 | A1 | * | 4/2002 | Tanaka | ...................... | G06F 1/18 |
| | | | | | | 320/116 |
| 2008/0241675 | A1 | * | 10/2008 | Enari | .................... | H01M 2/105 |
| | | | | | | 429/179 |
| 2016/0197337 | A1 | * | 7/2016 | Yau | ..................... | H01M 2/1055 |
| | | | | | | 429/7 |

* cited by examiner

*Primary Examiner* — William N Harris
(74) *Attorney, Agent, or Firm* — Rosenberg, Klein & Lee

(57) ABSTRACT

A battery pack comprises a housing shaped to fit into a battery compartment of a battery-operated device. A battery is disposed within the housing. A light source emitting at least 50 lumens is mounted to the housing and is operably coupled to the battery such that the light source is selectably powered by the battery via a manually operated switch and the battery pack is configured to operate as a lighting device so that the battery pack can be used as a stand-alone lighting device. The battery pack has electrical connections for electrically connecting to the battery-operated device when the battery pack is inserted into the battery compartment of the battery-operated device. The battery pack includes a positive battery terminal and a negative battery terminal disposed on the housing and configured to contact a mating positive terminal and negative terminal of the battery-operated device.

15 Claims, 3 Drawing Sheets

BATTERY PACK WITH LIGHT SOURCE

BACKGROUND

The field of the invention generally relates to battery packs, and more specifically to a battery pack having a lighting device source and operable as a standalone lighting device, wherein the battery pack can be removably inserted into a separate battery-operated device to power the battery operated device.

Various removable battery packs for powering battery-operated devices have been previously disclosed. For example, a variety of battery-powered power tools, toys, telephones, and other battery-operated devices utilize a battery pack for providing electrical power to operated the devices. The battery packs include a battery comprising one or more electrochemical battery cells, such as alkaline, lithium ion, lithium polymer (LiPo), nickel metal hydride (NiMH), nickel cadmium (NiCad), etc. The battery is mounted within a housing. The battery may be permanently mounted within the housing such that it is not removable or replaceable, or the battery is sometimes removable and replaceable within the housing. Some of the battery packs are rechargeable, i.e., the battery pack utilizes a rechargeable battery, and some are not rechargeable (e.g., they may use a non-rechargeable battery cell, or they may not include a connection and/or electrical circuitry required for recharging). Some of the previously disclosed battery packs are configured to be inserted into a battery compartment of the battery-operated device, while others are configured to removably attach to the battery-operated device such as being mounted onto a frame or housing of the battery-operated device.

Some of the previous battery packs have included various additional features, such as charge level status indicator lights.

While previous battery packs are useful for powering their respectively compatible battery-operated devices, the present invention provides a battery pack with improved functionality.

SUMMARY

The present invention is directed to an innovative battery pack having a light source such that the battery pack can be utilized as a stand-alone lighting device, as well as a battery pack for powering a battery-operated device. As used herein, the term "light source" and "lighting device" means that such element emits at least 50 lumens. For instance, the light source or lighting device may comprise a flashlight, UV light, laser, and/or worklight. This is in contrast to indicator lights which emit very low levels of light which are easily visible to the human eye, but do not emit levels of light sufficient light to serve any external illumination applications such as: lighting up a large work area (worklight), light a small area (flashlight), or serve a particular purpose as in a laser, or a UV light.

In one embodiment, a battery pack according to the present invention comprises a housing which provides a structural and protective shell for the battery pack. The housing is shaped to fit into a battery compartment of a battery-operated device. A battery, such as one or more electrochemical battery cells, is disposed within the housing. The battery may be rechargeable, or non-rechargeable.

A light source is mounted to the housing and is operably coupled to the battery such that the light source is selectably powered by the battery and the battery pack is configured to operate as a lighting device. In other words, the light source can be manually switched on using a manually operated activation such as a light switch and powered by the battery of the battery pack so that the battery pack can be used as a stand-alone lighting device.

The battery pack also has electrical connections for electrically connecting to the battery-operated device when the battery pack is inserted into the battery-compartment of the battery-operated device. The battery pack includes a positive battery terminal disposed on the housing and configured to contact a mating positive terminal of the battery-operated device when the battery pack is into the battery compartment of the battery-operated device. The battery pack also has a negative battery terminal disposed on the housing and configured to contact a mating negative terminal of the battery-operated device when the battery pack is in the battery compartment of the battery-operated device.

In another aspect of the present invention, the battery may be coupled to the light source by a light switch configured to selectively turn the power from the battery to the light source on and off. The light switch may be any suitable manually operated switch, such as a slide switch, a push-button switch, a touch sensitive switch, etc.

In still another aspect, the battery pack may be configured to be used in place of standard, commercial battery cells, such as a D cells, C cells, AA cells, AAA cells, etc., in a battery-operated device configured to operate on such standard battery cells. As used herein, the term "standard battery cell" means a widely available, standard sized battery cell which is not customized for compatibility with any particular device or group of devices. For example, the battery-operated device has a battery compartment configured to hold an arrangement of one or more standard battery cells. In such case, the housing of the battery pack is dimensioned to be securely received within the battery compartment in place of the arrangement of the one or more standard battery cells. As used herein, the term "securely received" in relation to the battery pack dimensions with respect to the battery compartment means that the housing has an exterior profile that is close-fitting to the battery compartment along sufficient surface area to secure the housing in place within the battery compartment. For example, the housing may be shaped substantially like the arrangement of the one or more standard battery cells. As an example, the arrangement of the one or more standard battery cells may be 3 D cells aligned linearly end to end forming an elongated cylindrical shape. The housing for this configuration may be an elongated cylinder. Alternatively, the housing could have a short cylindrical portion at each end which is close-fitting to the shape of the battery compartment, and a different shape between the cylindrical portions which is not necessarily close-fitting to the shape of the battery compartment, so long as the cylindrical portions secure the battery pack in place within the battery compartment.

In yet another feature of the present invention, the battery of the battery pack may be removable and replaceable within the battery pack. A battery compartment, referred to as a "battery chamber" so as to distinguish from the battery compartment of the battery-operated device), is disposed in the housing. The battery chamber is configured to removably receive the battery. The battery chamber has a moveable cover which can be opened to access the battery chamber to install and remove the battery from the battery chamber and closed to cover the battery chamber. The battery chamber has battery chamber terminals configured to contact the battery terminals of the battery.

In another aspect, the battery pack may include an input power port mounted to the housing for charging the battery. The input power port is operably coupled to the battery and is configured to be connected to a charging source for charging the battery.

In still another feature, the battery pack may also include an output power port mounted to the housing for connecting the battery pack to a battery-powered device via the output power port. For example, one end of a power cable can be connected to the output power port and the other end can be connected to the battery-powered device.

In yet another feature, the battery pack may also have a first status indicator light configured to emit a light based on a status of the battery pack. For example, the status indicator light may indicate the charge status of the battery, such as charging, or fully charged.

In still another feature, the battery pack may also have a second status indicator light configured to emit a light based on a status of the output power port. For example, the status indicator light may indicate whether the output power port is being utilized to power a battery-powered device.

In yet another aspect, the light source may comprise a plurality of lights arranged in an array on the housing. The lights may be arranged in a rectangular array having a plurality of rows, and one or more columns, or in a circular array, or in any other arrangement.

In another feature of the battery pack, one or more magnets may be disposed anywhere on the housing, but typically placed on the housing opposing the side of the housing on which the light source is mounted. The magnet(s) are configured to secure the battery pack to a magnetizable surface. This can be very useful when using the light source to light a work area, for instance.

Accordingly, a new and useful battery pack is provided which can be installed in a battery-compartment of a battery-operated device to power the battery-operated device, and which can also be used as a standalone lighting device.

BRIEF DESCRIPTION OF THE DRAWINGS

The invention is illustrated by way of example and not limitation in the figures of the accompanying drawings, in which like reference numbers refer to similar elements, and in which.

DETAILED DESCRIPTION

Figure 1:
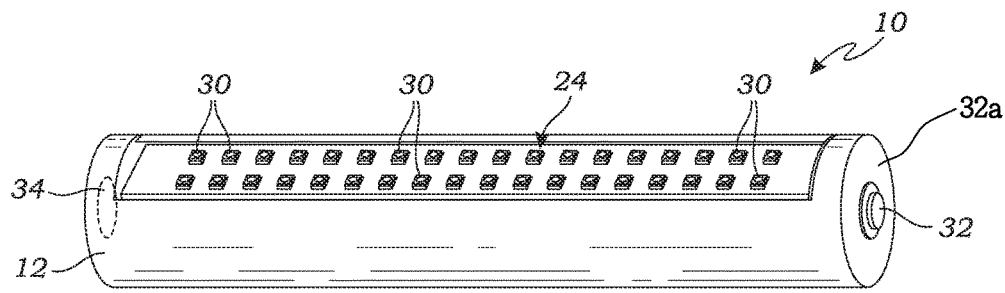
FIG. 1 is a top, side perspective view of a battery pack, according to one embodiment of the present invention.
Figure 2:
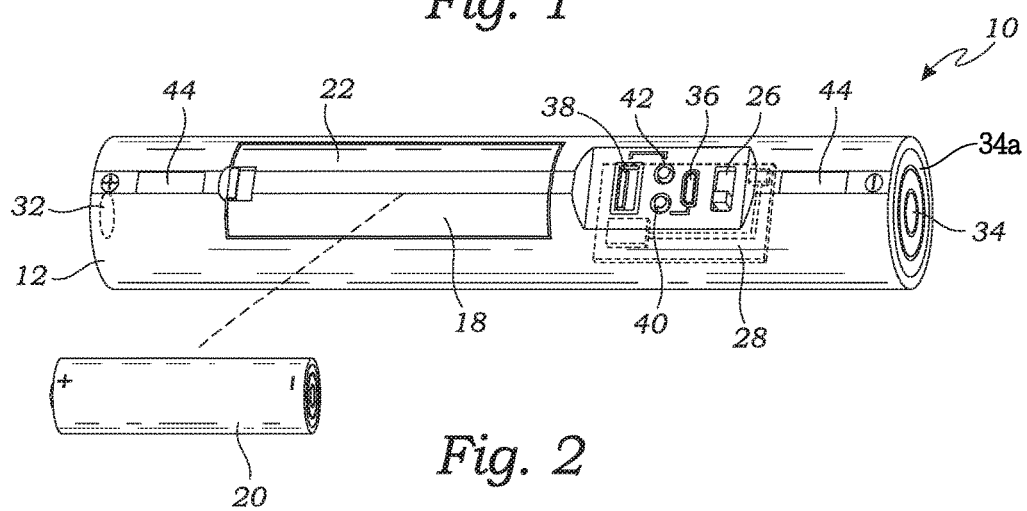
FIG. 2 is a bottom, side perspective view of the battery pack of FIG. 1, and a removable battery configured for installation in the battery chamber of the battery pack.
Figure 3:
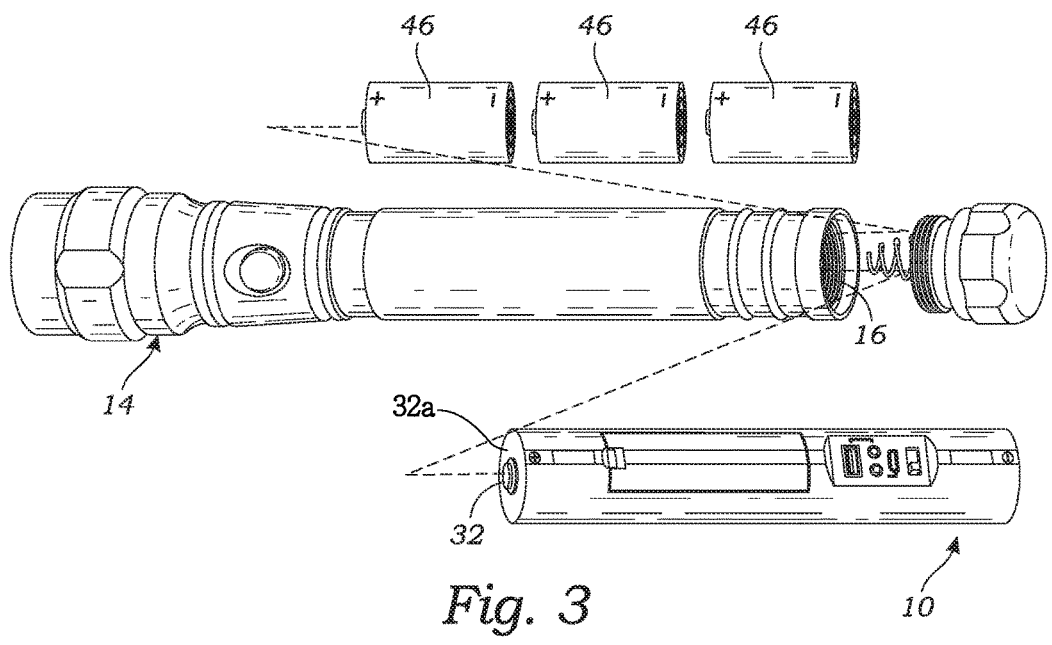
FIG. 3 is a side elevation of the battery pack of FIG. 1, a flashlight (battery-operated device) having a battery compartment configured to receive the battery pack, and an arrangement of standard battery cells configured for use in the flashlight.

Turning first to FIGS. 1-3, one embodiment of a battery pack 10 according to the present invention is shown. As described herein, the battery pack 10 can be utilized as a power source for a battery-operated device and as a standalone lighting device. The battery pack 10 comprises a housing 12 which forms the primary structural part of the battery pack 10. The housing may be formed from any suitable material, such as polymers, plastic, metal, or other suitable material. The housing 12 is shaped to fit into a battery compartment of a battery-operated device, such as the battery compartment 16 of the flashlight 14 shown in FIG. 3. It should be understood that the substantially cylindrical shape of the housing 12 and the cylindrical shape of the compatible battery compartment 16 are only examples, and the shape of the housing 12 and compatible battery compartment 16 can be any suitable shape, so long as the housing 12 is dimensioned to be securely received within the battery compartment 16. For example, the battery compartment 16 may be a rectangular box shape, a triangular box shape, the shape of an arrangement of one or more standard batteries, or any other suitable shape.

The housing 12 has a battery chamber 18 configured to receive and secure a battery 20. The battery pack 10 is configured such that the battery 20 is removable and replaceable within the battery pack 10. In other embodiments of the present invention, the battery 20 may be permanently installed in the battery chamber 18, such as by molding the housing 12 onto the battery 20, or by otherwise fixing the battery 20 in the chamber 18, such as by adhesive, fasteners, or other means. The battery chamber 18 has a moveable cover 22 which can be opened to access the interior of the battery chamber 18 to install and remove the battery 20 from the battery chamber 18 and closed to cover the battery chamber 18. The battery chamber 18 typically includes battery chamber terminals (not shown) configured to contact the battery terminals 22 of the battery 20. The moveable cover 22 may not be present in other embodiments of the present invention whereby the battery 20 will be considered permanently installed.

The battery 20 may be any suitable battery for generating electrical energy, such as one or more electrochemical battery cells. The battery may be rechargeable, or non-rechargeable. As some examples, the battery may comprise one or more electrochemical battery cells, such as alkaline, lithium ion, lithium polymer (LiPo), nickel metal hydride (NiMH), nickel cadmium (NiCad), etc.

A light source 24 is mounted to the housing 12. The light source 24 is operably coupled to the battery 20 via a light switch 26 (and electronic controller 28, as described below) such that the light source 24 is selectably powered by the battery 20. The light switch 26 may be any suitable switch for selectably applying power from the battery 20 to the light source 24, such as the slide switch shown in FIGS. 2 and 3, a push-button switch, a touch sensitive switch, etc. As shown in the embodiments described herein, the light switch 26 is manually operated such that upon manual activation of the light switch 26 to turn on the light source 24, the light source 24 will turn on and remain on until the light switch 26 is manually activated to turn the light source 24 off. The battery pack 10 may also have a battery saver circuit to turn off the light source 24 after a period of "on" time in order to preserve the battery 20, such as in the case that the light switch 26 is inadvertently switched on or left on undesirably.

The battery pack 10 may further comprise an electronic controller 28 which is operably coupled to the light switch 26, the light source 24 and the battery 20 (as well as the status indicator lights 40 and 42, input power port 36, and output power port 38, as described below). The electronic controller 28 comprises electronic components for controlling the operation of the battery pack 10, including turning the light source 24 on and off in response to activation of the light switch 26, turning the status indicator lights on and off, controlling the charging of the battery 20 through the input power port 36, and controlling the power through the output power port 38 when it is connected to a battery-powered device. The electronic controller 28 may comprise a programmable processor and/or other logic devices for controlling the various functions of the battery pack 10.

The light source 24 comprises an array of a plurality of lights 30. The lights 30 may be any suitable electric light, such as LED (light emitting diode), SMD LED (surface-mount-device LED), COB LED (chip on board LED), incandescent, or any other suitable light. The lights 30 are operably coupled to the electronic controller 28 which controls the operation of the lights 30. For LED lights 30, an LED driver circuit is provided either as part of the electronic controller 28 or a separate component operably coupled to the LED lights 30 and the electronic controller 28.

Accordingly, the battery pack 10 is configured for use as a standalone lighting device. The light switch 26 is activated to turn on the light source 24, and the electronic controller 28 applies power from the battery 20 to the light source 24 (which may be via a light driver circuit), thereby turning on the lights 30 of the light source 24. To turn off the light source 24, the light switch is activated to turn off the light source, such as by moving the light switch 26 to the "off" position. The electronic controller 28 then cuts the power to the light source 24 which turns off the lights 30.

The battery pack 10 has electrical connections for electrically connecting the battery pack 10 to the battery-operated device 14 when the battery pack 10 is inserted into the battery-compartment 16 of the battery-operated device 14. The battery pack 10 has a positive battery terminal 32 disposed on a first base 32a located at a first end of the housing 12. The positive battery terminal 32 is located and configured to contact a mating positive terminal of the battery-operated device 14 when the battery pack 10 is installed in the battery compartment 16 of the battery-operated device 14. The battery pack 10 has a negative battery terminal 34 disposed on a second base 34a located at a second end of the housing 12 opposite the first end. The negative battery terminal 34 is located and configured to contact a mating negative terminal of the battery-operated device 14 when the battery pack 10 is installed in the battery compartment 16 of the battery-operated device 14. The locations of the positive battery terminal 32 and negative battery terminal 34 do not have to be at either end of the housing 12, but may be at any suitable location of the battery pack 10 in which they are located to mate with the mating terminals of the battery-operated device 14.

The battery pack 10 also has an input power port 36 mounted to the housing 12 and configured to be connected to a charging source for charging the battery 20. The input power port 36 is operably coupled to the battery 20 via the electronic controller 28. The input power port 36 may comprise any suitable connector, such as a micro-USB, mini-USB, standard USB, or any other suitable connector to charge the battery 20.

An output power port 38 is also mounted to the housing 12 and configured to connect the battery pack 10 to a battery-powered device (not shown) to power the battery-powered device. The output power port 38 is operably coupled to the battery 20 via the electronic controller 28. The output power port 38 may comprise any suitable connector, such as a micro-USB, mini-USB, standard USB, or any other suitable connector to facilitate the transfer of energy from the battery to the connected battery-operated device. A battery-powered device may be connected to the output power port 38 using a power cord with one end of the power cord connected to the output power port 38 and the other end connected to the battery-powered device. The electronic controller 28 may be configured to detect when a battery-powered device is connected to the output power port 38 and to automatically facilitate the transfer of energy from the battery pack 10 to the battery-powered device, or the battery pack 10 can be provided with a button to facilitate the transfer of energy between the devices.

The battery pack 10 has a first status indicator light 40 for indicating the charging status of the battery pack 10. The first status indicator light 40 is configured to emit a plurality of different colored light based on a status of the battery pack 10. The first status indicator light 40 light indicates the charge status of the battery. The first status indicator light 40 emits a first color light, such as red, when the input power port 36 is connected to a charging power source and the battery 20 is being charged but is not fully charged. The first status indicator light 40 emits a second color light different from the first color light, such as green, when the input power port 36 is connected to a charging power source and the battery 20 is fully charged. The first status indicator light remains off when the input power port is not connected to a charging power source or the charging power source is not powered on.

The battery pack 10 has a second status indicator light 42 configured to emit a light based on a status of the output power port 38. The second status indicator light 42 indicates whether the output power port 38 is being utilized to power a battery-powered device. The second status indicator light 42 turns on and emits a light when the output power port 38 is being utilized to power a battery-powered device. The second status indicator light 42 remains off when the output power port is not being utilized to power a battery-operated device.

The battery pack 10 also has a pair of magnets 44 disposed on the housing 12 on the opposite side of the housing 12 from the light source 24. The magnets 44 are configured to secure the battery pack 10 to a magnetizable surface. This can useful for storing the battery pack 10 and for mounting the battery pack 10 in a location where the light source 24 can be directed onto a desired area, such as a work area.

As depicted in FIG. 3, the battery pack 10 is configured to be used in place of an arrangement of standard, commercial battery cells 46, where the battery-operated device 14 is configured to operate on such standard battery cells. The battery-operated device 14 is designed to use three standard battery cells 46 arranged end to end when inserted into the battery compartment 16 of the battery-operated device 14. The size, number, and arrangement of the standard battery cells depends on the design of the battery-operated device, and may vary from device to device. The standard battery cells may be any size battery cells, such as D cells, C cells, AA cells, AAA cells, etc., in a battery-operated device configured to operate on such standard battery cells. The housing 12 of the battery pack 10 is dimensioned to be securely received within the battery compartment 16 in place of the arrangement of the one or more standard battery cells. In this embodiment, the housing 12 is shaped to substantially match the elongated cylindrical arrangement of the three standard battery cells 46 for which the battery-operated device 14 is configured. Thus, the housing 12 has a substantially cylindrical shape matching the cylindrical battery compartment 16, but the housing also has portions which are only partially cylindrical between the two cylindrical portions at each end of the cylinder. Many alternative shapes for the housing 12 are possible, so long as they result in being securely received within the battery-compartment 16 which is shaped to receive an arrangement of standard battery cells. For instance, the arrangement of battery cells 46 does not have to be linear and end to end, but can include batteries arranged side by side in parallel, or combinations of end to end and side by side, or other suitable arrangements.

Figure 4:
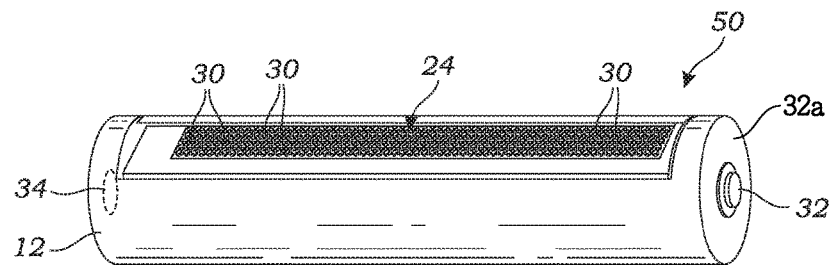
FIG. 4 is a top, side perspective view of a battery pack, according to another embodiment of the present invention.
Figure 5:
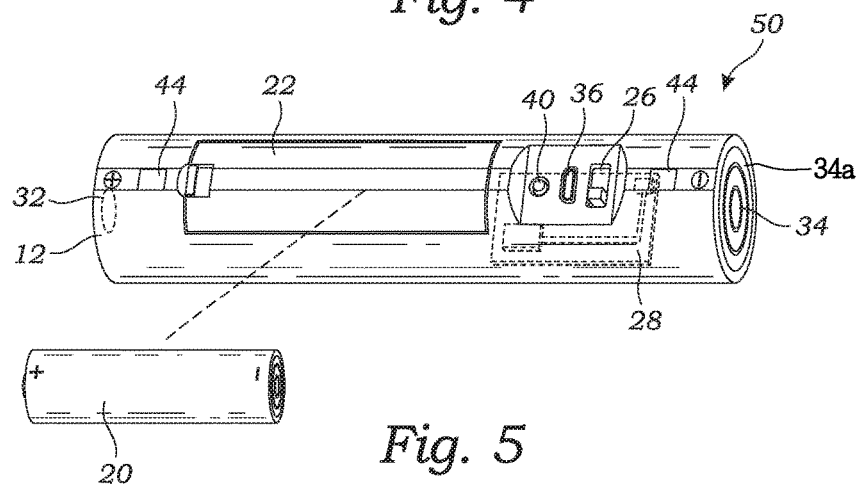
FIG. 5 is a bottom, side perspective view of the battery pack of FIG. 4, and a removable battery configured for installation in the battery chamber of the battery pack.
Figure 6:
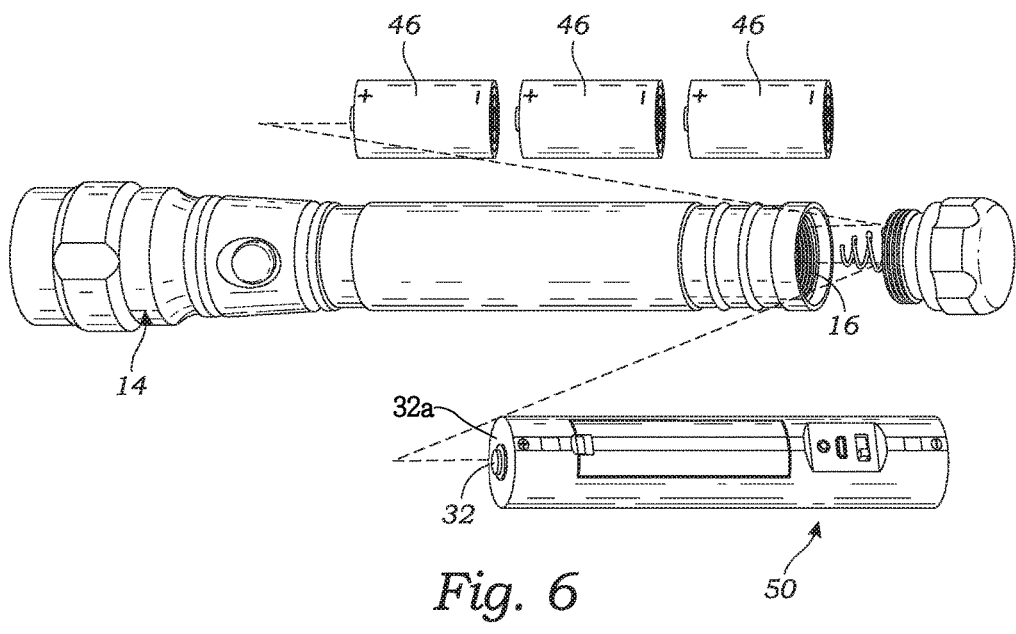
FIG. 6 is a side elevation of the battery pack of FIG. 1, a flashlight (battery-operated device) having a battery compartment configured to receive the battery pack, and an arrangement of standard battery cells configured for use in the flashlight.

Turning now to FIGS. 4-6, another embodiment of a battery pack 50 according to the present invention is shown. The battery pack 50 is similar to the battery pack 10 described above, except that the light source 24 has a different configuration for the array of lights 30, and it does not include an output power port 38 or a second status indicator light 42. Accordingly, like reference numerals refer to like elements among the embodiments, and the description(s) of such elements herein with respect to FIGS. 1-3 applies equally to the elements shown in FIGS. 4-6. Thus, such descriptions are not repeated. The dense array of lights 30 in the light source 24 of battery pack 50 is also more suited to the use of COB LEDs, although the battery pack 50 is not limited to using COB LEDs for the lights 30.

Figure 7:
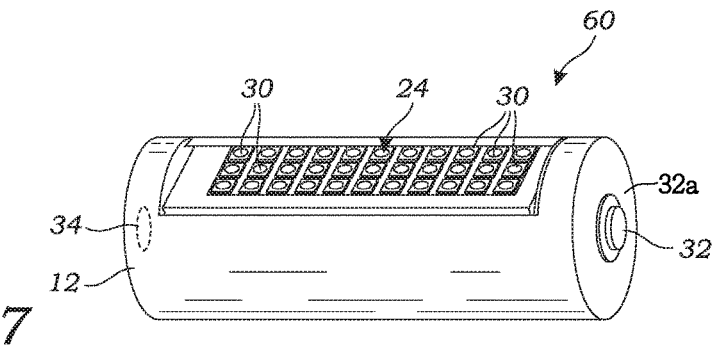
FIG. 7 is a top, side perspective view of a battery pack, according to another embodiment of the present invention.
Figure 8:
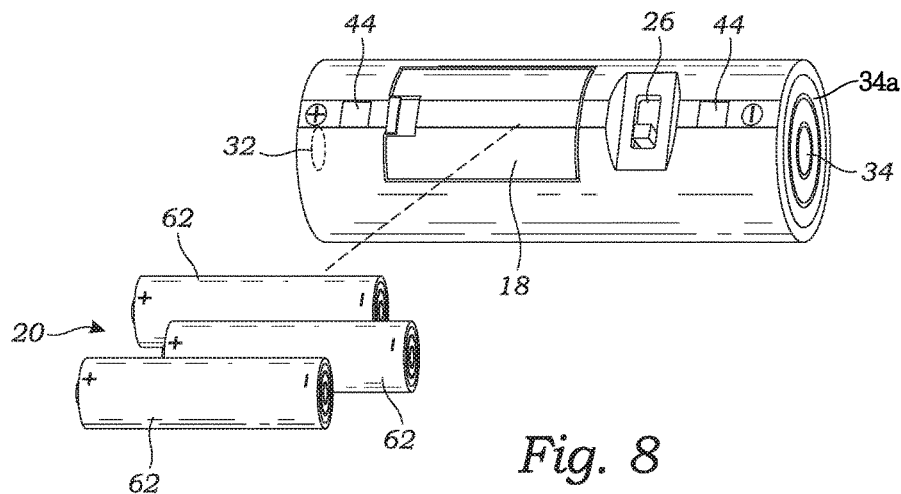
FIG. 8 is a bottom, side perspective view of the battery pack of FIG. 7, and standard battery cells for installation in the battery chamber of the battery pack.
Figure 9:
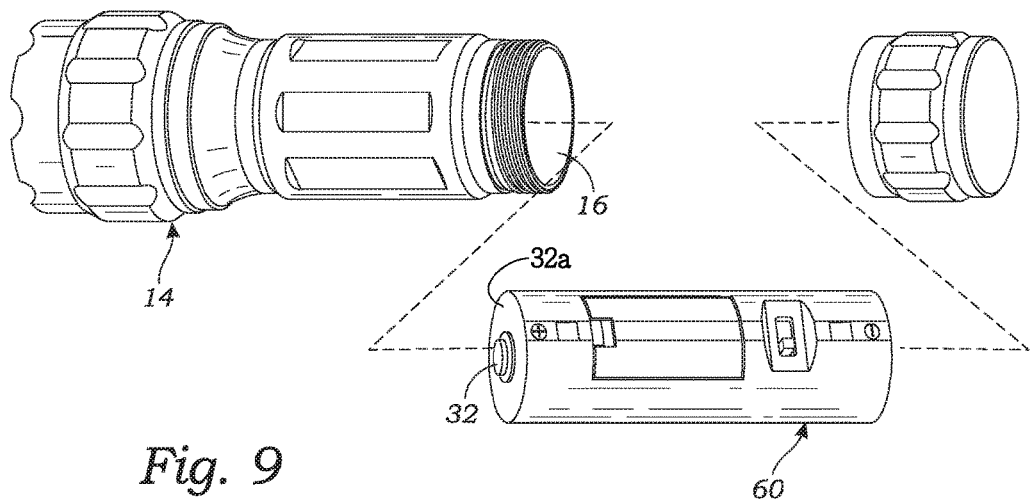
FIG. 9 is a side elevation of the battery pack of FIG. 7, and a flashlight (battery-operated device) having a battery compartment configured to receive the battery pack.

Referring now to FIGS. 7-9, still another embodiment of a battery pack 60 according to the present invention is shown. The battery pack 60 is similar to the battery packs 10 and 50 described above, except that the shape of the battery pack 60 is shorter, and the battery pack 60 uses battery cells 62 as the battery 20, the light source 24 has a different configuration for the array of lights 30, and the battery pack 60 does not include an input power port 36, an output power port 38, a first status indicator light 40, or a second status indicator light 42. Also, note that the housing of the battery pack 60 may not be shaped as a replacement of an arrangement of standard battery cells in this embodiment, or alternatively, it could also be shaped as a replacement of standard battery cells. Accordingly, like reference numerals refer to like elements among the embodiments, and the description of such elements herein with respect to FIGS. 1-6 applies equally to the elements shown in FIGS. 7-9, and such descriptions are not repeated. The battery cells 62 install in the battery chamber 18 of the housing 12. The battery cells 62 may be rechargeable or non-rechargeable, and may be standard battery cells (any suitable size) or non-standard battery cells, such as custom or specially configured battery cells. Since the battery pack 60 does not have an input power port 36, it is not capable of charging the battery cells 62 within the battery chamber 18. In the case that the battery cells 62 are rechargeable, the battery pack 60, or the batteries 62 removed from the battery pack 60, would be coupled to a battery charger to recharge the battery cells 62. Due to the lack of power ports and indicator lights, the battery pack 60 may not require an electronic controller 28, although it may be provided in order to operate the light switch 26 and a driver circuit for the lights 30 (e.g., when LED lights are used and a driver circuit is required).

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. Accordingly, embodiments are intended to exemplify alternatives, modifications, and equivalents that may fall within the scope of the claims. The invention, therefore, should not be limited, except to the following claims, and their equivalents.

What is claimed is:

1. A battery pack, comprising:
   a housing having a shape configured to fit into a battery compartment of a battery-operated device;
   a battery disposed within the housing, one or more magnets disposed on the housing and configured to secure the battery pack to a magnetizable surface;
   a light source mounted to the housing and comprising a plurality of lights arranged in an array on a first side of the housing, the light source operably coupled to the battery by a manually operated light switch configured to turn the power to the light source on and off, such that the battery pack is configured to operate as a lighting device;
   a positive battery terminal disposed on the housing and configured to contact a mating positive terminal of the battery-operated device when the battery pack is in the battery compartment of the battery-operated device; and
   a negative battery terminal disposed on the housing and configured to contact a mating negative terminal of the battery-operated device when the battery pack is in the battery compartment of the battery-operated device.

2. The battery pack of claim 1, wherein the battery compartment of the battery-operated device is configured to receive an arrangement of one or more standard battery cells and the housing is dimensioned to be securely received within the battery compartment in place of the arrangement of the one or more standard battery cells.

3. The battery pack of claim 1, wherein the housing is substantially cylindrical in shape with a first base at one end of the cylinder and a second base at an opposing end of the cylinder, and
   the positive battery terminal is disposed on the first base and the negative battery terminal is disposed on the second base.

4. The battery pack of claim 1, further comprising:
   a battery chamber disposed in the housing and configured to removably receive the battery, the battery chamber having a moveable cover which can be opened to access the battery chamber to install and remove a battery from the battery chamber and closed to cover the battery chamber, the battery chamber further comprising battery chamber terminals configured to contact battery terminals of the battery.

5. The battery pack of claim 1, further comprising:
an input power port operably coupled to the battery and configured to be connected to a charging source for charging the battery.

6. The battery pack of claim 1, further comprising:
an output power port operably coupled to the battery and configured to be connected to a battery-powered device.

7. The battery pack of claim 1, further comprising:
a status indicator light configured to emit a plurality of different colored light based on a status of the battery pack.

8. The battery pack of claim 1, further comprising:
an input power port operably coupled to the battery and configured to be connected to a charging source for charging the battery;
an output power port operably coupled to the battery and configured to be connected to a battery-powered device; and
a first status indicator light, the first status indicator light configured to: emit a first color light when a charging power source is connected to the input power port to charge the battery and the battery is not fully charged; emit a second color light different from the first color light when a charging power source is connected to the input power port to charge the battery and the battery is fully charged; and remain off when the input power port is not connected to a charging power source.

9. The battery pack of claim 8, further comprising:
a second status indicator light, the second status indicator light configured to: emit a light when the output power port is being utilized to charge a battery-powered device; and remain off when the output power port is not being utilized to charge the battery-powered device.

10. A battery pack, comprising:
a housing configured to fit into a battery compartment of a battery-operated device configured to receive an arrangement of one or more standard battery cells, the housing dimensioned to be securely received within the battery compartment in place of the arrangement of the one or more standard battery cells, the housing having a first base at one end of the housing and a second base at an opposing end of the housing;
a battery disposed within the housing, one or more magnets disposed on the housing and configured to secure the battery pack to a magnetizable surface;
a light source mounted to the housing and operably coupled to the battery by a manually operated light switch configured to turn the power to the light source on and off, such that the battery pack is configured to operate as a lighting device;
a positive battery terminal disposed on the first end of the housing and configured to contact a mating positive terminal of the battery-operated device when the battery pack is in the battery compartment of the battery-operated device; and
a negative battery terminal disposed on the second end of the housing and configured to contact a mating negative terminal of the battery-operated device when the battery pack is in the battery compartment of the battery-operated device.

11. The battery pack of claim 10, further comprising:
a battery chamber disposed in the housing and configured to removably receive the battery, the battery chamber having a moveable cover which can be opened to access the battery chamber to install and remove a battery from the battery chamber and closed to cover the battery chamber, the battery chamber further comprising battery chamber terminals configured to contact battery terminals of the battery.

12. The battery pack of claim 10, further comprising:
an input power port operably coupled to the battery and configured to be connected to a charging source for charging the battery.

13. The battery pack of claim 10, further comprising:
a status indicator light configured to emit a plurality of different colored light based on a status of the battery pack.

14. The battery pack of claim 10, further comprising:
an input power port operably coupled to the battery and configured to be connected to a charging source for charging the battery;
an output power port operably coupled to the battery and configured to be connected to a battery-powered device; and
a first status indicator light, the first status indicator light configured to: emit a first color light when a charging power source is connected to the input power port to charge the battery and the battery is not fully charged; emit a second color light different from the first color light when a charging power source is connected to the input power port to charge the battery and the battery is fully charged; and remain off when the input power port is not connected to a charging power source; and
a second status indicator light, the second status indicator light configured to: emit a light when the output power port is being utilized to charge a battery-powered device; and remain off when the output power port is not being utilized to charge the battery-powered device.

15. The battery pack of claim 10, wherein the light source comprises a plurality of lights arranged in an array on the housing.

* * * * *